(12) United States Patent
Allouche et al.

(10) Patent No.: US 9,052,394 B2
(45) Date of Patent: Jun. 9, 2015

(54) METHOD AND APPARATUS FOR DETECTING BURIED OBJECTS

(75) Inventors: Erez N. Allouche, Ruston, LA (US); Arun Jaganathan, Ruston, LA (US); Neven Simicevic, Ruston, LA (US)

(73) Assignee: Louisiana Tech University Research Foundation, Ruston, LA (US)

( * ) Notice: Subject to any disclaimer, the term of this patent is extended or adjusted under 35 U.S.C. 154(b) by 54 days.

(21) Appl. No.: 13/500,722

(22) PCT Filed: Oct. 6, 2009

(86) PCT No.: PCT/US2009/059626
§ 371 (c)(1),
(2), (4) Date: Nov. 19, 2012

(87) PCT Pub. No.: WO2011/043766
PCT Pub. Date: Apr. 14, 2011

(65) Prior Publication Data
US 2013/0071213 A1 Mar. 21, 2013

(51) Int. Cl.
*G01V 3/08* (2006.01)
*G01S 13/88* (2006.01)
*E02F 9/24* (2006.01)
*G01S 7/41* (2006.01)
*G01S 13/04* (2006.01)
*G01S 13/10* (2006.01)
*G01V 3/15* (2006.01)
*E02F 1/00* (2006.01)

(52) U.S. Cl.
CPC .............. *G01S 13/885* (2013.01); *E02F 9/245* (2013.01); *G01S 7/41* (2013.01); *G01S 13/04* (2013.01); *G01S 13/10* (2013.01); *G01V 3/15* (2013.01); *E02F 1/00* (2013.01)

(58) Field of Classification Search
CPC .................. G01S 13/885; G01S 13/04–13/48; E02F 9/245; E02F 9/26–9/262; G01V 3/15; G01V 3/165; G01V 3/17; G01V 3/081; E21B 47/04; E21B 47/09; E21B 47/0905
USPC ..................... 324/326, 329, 67, 332, 344, 337
See application file for complete search history.

(56) References Cited

U.S. PATENT DOCUMENTS

| | | |
|---|---|---|
| 3,426,146 A | 2/1969 | Seaman |
| 3,907,136 A | 9/1975 | Christides et al. |
| 4,309,704 A * | 1/1982 | Anderson ............... 342/15 |
| 4,783,630 A | 11/1988 | Shoemaker |

(Continued)

FOREIGN PATENT DOCUMENTS

| | | |
|---|---|---|
| AR | 200124408 A | 1/2001 |
| EP | 1379735 | 1/2004 |

(Continued)

OTHER PUBLICATIONS

Langley et al., Balanced antipodal vivaldi antenna for wide bandwidth phased arrays, Apr. 1996, IEEE, Proc-.Microw. Antennas Propag., vol. 143, No. 2.*

Krause et al., Surveying Goes Underground; http://www.profsurv.com/magazine/article.aspx?i=2087; Mar. 2008; 4 pgs.

(Continued)

*Primary Examiner* — Reena Aurora
(74) *Attorney, Agent, or Firm* — Faegre Baker Daniels LLP (57) ABSTRACT

An object detection system (24) is disclosed having a transducer (40, 40') for detecting buried objects (26). The transducer is encapsulated within a robust, electromagnetically transparent construction (42).

36 Claims, 5 Drawing Sheets

(56) References Cited

U.S. PATENT DOCUMENTS

| | | | |
|---|---|---|---|
| 5,327,345 | A | 7/1994 | Nielsen et al. |
| 5,592,092 | A | 1/1997 | Mechler |
| 5,607,205 | A | 3/1997 | Burdick et al. |
| 5,949,382 | A * | 9/1999 | Quan .......................... 343/767 |
| 6,172,504 | B1 | 1/2001 | Earle |
| 6,377,872 | B1 | 4/2002 | Struckman |
| 6,437,726 | B1 | 8/2002 | Price |
| 6,522,285 | B2 | 2/2003 | Stolarczyk et al. |
| 6,546,529 | B1 | 4/2003 | Dansky et al. |
| 6,667,709 | B1 | 12/2003 | Hansen et al. |
| 6,700,526 | B2 | 3/2004 | Witten |
| 6,729,050 | B2 | 5/2004 | Whitten et al. |
| 6,735,888 | B2 | 5/2004 | Green et al. |
| 6,751,553 | B2 | 6/2004 | Young et al. |
| 6,879,161 | B2 | 4/2005 | Rowan |
| 6,975,942 | B2 | 12/2005 | Young et al. |
| 7,336,078 | B1 | 2/2008 | Merewether et al. |
| 7,400,976 | B2 | 7/2008 | Young et al. |
| 7,410,323 | B1 | 8/2008 | Roth |
| 7,431,401 | B2 | 10/2008 | We.beta.elmann et al. |
| 7,443,154 | B1 | 10/2008 | Merewether et al. |
| 7,516,563 | B2 | 4/2009 | Koch |
| 7,648,309 | B2 | 1/2010 | Roth |
| 2002/0011947 | A1 | 1/2002 | Stolarczyk et al. |
| 2002/0063652 | A1 | 5/2002 | Price |
| 2002/0184235 | A1 | 12/2002 | Young et al. |
| 2003/0041485 | A1 | 3/2003 | Whitten et al. |
| 2004/0155810 | A1 | 8/2004 | Witten |
| 2004/0168358 | A1 | 9/2004 | Stump |
| 2004/0210370 | A1 | 10/2004 | Gudat et al. |
| 2004/0225444 | A1 | 11/2004 | Young et al. |
| 2005/0080559 | A1 | 4/2005 | Ishibashi et al. |
| 2006/0085133 | A1 | 4/2006 | Young et al. |
| 2007/0195647 | A1 | 8/2007 | Butler et al. |
| 2008/0133128 | A1 | 6/2008 | Koch |
| 2008/0136703 | A1 | 6/2008 | Yoshimura |
| 2008/0180523 | A1 | 7/2008 | Stratton et al. |
| 2008/0185903 | A1 | 8/2008 | Bausov et al. |
| 2008/0208415 | A1 | 8/2008 | Vik |
| 2008/0292400 | A1 | 11/2008 | Roth |
| 2009/0024326 | A1 | 1/2009 | Young et al. |
| 2009/0185865 | A1 | 7/2009 | Sharp et al. |

FOREIGN PATENT DOCUMENTS

| | | |
|---|---|---|
| JP | 1998159789 U | 6/1988 |
| JP | 1989-046684 | 2/1989 |
| JP | 02-010081 | 1/1990 |
| JP | 199014801 B2 | 4/1990 |
| JP | 1992-140333 | 5/1992 |
| JP | 06-222152 | 8/1994 |
| JP | 1994-230141 | 8/1994 |
| JP | 1996-008629 | 1/1996 |
| JP | 1998215105 A | 8/1998 |
| JP | 1998221465 A | 8/1998 |
| JP | 2001192607 A | 7/2001 |
| JP | 2002-181955 | 6/2002 |
| JP | 2004-514913 | 5/2004 |
| JP | 2009148833 | 7/2009 |
| WO | WO 2007/101902 | 9/2007 |
| WO | WO 2009/029819 | 3/2009 |

OTHER PUBLICATIONS

Patterson, Combining Two Technologies to Help Map Water Lines and Reduce Project Cost; http://www.mckimcreed.com/media/pdf/white_papers/CombiningTwoTechnologies.pdf; presented at 2007 Florida Water Resources Conference; 8 pgs.

Louisiana Tech University; http://www.latech.edu/news/01092009-NIST.shtml, Jan. 2009, 2 pgs.

Adnan Sahin et al., *Object Detection Using High Resolution Near-Field Array Processing*, IEEE Transactions on Geoscience and Remote Sensing, vol. 39, No. 1, Jan. 2001, pp. 136-141.

Eric L. Miller et al., *Detection and Localization of Obscured Objects from Near Field Senor Array Data: Physical Models and Statistical Processing*, IEEE, pp. 370-374, 1998.

David A. Hill, *Near-Field Detection of Buried Dielectric Objects*, IEEE Transactions on Geoscience and Remote Sensing; vol. 27, No. 4, Jul. 1989, pp. 364-368.

Caner Ozdemir et al., *Interpretation of Scattering Phenomenology in Dielectric-Coated Wire Via Joint Time-Frequency Processing*, IEEE, 1996, pp. 630-633.

Fu-Chiarng Chen et al. *An Impulse Radar Nondestructive Evaluation System*, Review of Progress in Quantitiative Nondestructive Evaluation, vol. 16, Edited by D.O. Thompson and D.E. Chimenti, Plenum Press, New York, 1997, pp. 709-716.

Daniel H. Schaubert, et al. *Proceedings of the 1996 Antenna Applications Symposium*; RL-TR-97-189 Final Technical Report, Oct. 1997, pp. 269-280.

Maximillian J. Kieba, *Differential Soil Impedance Obstacle Detection*, Quarterly Technical Report (May 1 through Jul. 31, 2002), Submitted by Gas Technology Institute, Aug. 30, 2002, 31 pgs.

Brian J. Huber, *Capacitive Tomography for the Location of Plastic Pipe*, Final Technical Report, Submitted by Gas Technology Institute, Dec. 30, 2003; 49 pgs.

Takaharu Nakauchi, et al., *A Small Prospecting Radar System*, A Radar System for Non-Excavation Drilling, Proceedings of the Society of Exploration Geophysicists of Japan (SEGJ) Conference, Japan, vol. 98, pp. 217-221, 2000.

Hyung Seok Jeong et al., Final Report FHWA/IN/JTRP-2003/12 *Imaging and Locating Buried Utilities*, School of Civil Engineering, Purdue University, West Lafayette, IN, Oct. 2003; 257 pgs.

Takuya Sakamoto, *Nonparametric Imaging Algorithms for UWB Pulse Radars*, 128 pgs.

Takaharu Nakauchi, et al., *A Small GPR for Horizontal Directional Drilling System*, Small Prospecting Radar System, Proceedings of the the Eighth International Conference on Ground Penetrating Radar, Australia, pp. 548-551, 2005.

Dr. Nicole Metje, et al., *Mapping the Underworld—State-of-the-Art Review*; Manuscript Draft, Elsevier Editorial System(tm) for Tunnelling and Underground Space Technology, 51 pgs.

Petr Piksa; et al., *Small Vivaldi Antenna for UWB*, 4 pgs., 2005.

Gary Breed, *A Summary of FCC Rules for Ultra Wideband Communications*, High Frequency Electronics, Jan. 2005, 2 pgs.

Written Opinion of the International Searching Authority for Application No. PCT/US2009/059626; Dec. 3, 2009, 9 pgs.

International Preliminary Report on Patentability for Application No. PCT/US09/59626, Dec. 20, 2011, 15 pgs.

Antenna Engineering Handbook, Jan. 25, 2001, pp. 128, 412 and 413.

Japanese Office Action issued Jun. 24, 2014 in related Japanese Application No. 2012/533124 and the English translation thereof.

* cited by examiner

METHOD AND APPARATUS FOR DETECTING BURIED OBJECTS

CROSS-REFERENCE TO RELATED APPLICATIONS

This application is a nationalization of PCT Patent Application Serial No. PCT/US2009/59626, filed Oct. 6, 2009, the disclosure of which is expressly incorporated herein by reference.

BACKGROUND

1. Field of the Invention

The present disclosure relates to a radiating structure for detecting buried objects. More particularly, the present disclosure relates to an antenna structure for detecting buried objects during mechanical excavations, and to a method for utilizing the same.

2. Description of the Related Art.

Many excavations are performed in well-developed, utility-congested areas. The congestion of underground space in many urban areas, combined with poor record keeping and difficulties in accurately locating buried utilities from the surface, has led to many inadvertent utility strikes during mechanical excavations. Utility strikes may lead to work-stop orders and delays, mechanical damage to buried utilities, and numerous costs associated with litigation, insurance, downtime, and repair.

SUMMARY

According to an embodiment of the present invention, a construction vehicle is provided including a chassis; a plurality of traction devices positioned to support the chassis; a work tool supported by the chassis and configured to penetrate the ground; and a detector mounted to the work tool and configured to detect an object positioned in the ground during a penetration of the ground with the work tool.

According to another embodiment of the present invention, a detector assembly is provided that is configured to detect an object positioned in the ground. The detector assembly includes at least one transducer configured to communicate a ground-penetrating signal; and a dielectric medium substantially encapsulating the at least one transducer to substantially reduce signal loss during a communication of the ground-penetrating signal between the at least one transducer and the ground.

According to another aspect of the present invention, a detector is provided that is configured to detect an object positioned in the ground. The detector includes at least one transducer configured to communicate a ground-penetrating signal; and a dielectric medium positioned between the at least one transducer and the ground during a communication of the ground-penetrating signal to substantially reduce signal loss during the communication of the ground-penetrating signal between the at least one transducer and the ground.

According to another aspect of the present invention, a method of detecting an object positioned in the ground is provided. The method includes the steps of: providing a detector that communicates a ground-penetrating signal between the object and the detector; penetrating the ground with a tool to create a penetration; positioning at least a portion of the detector in the penetration; and detecting the object while the portion of the detector is located in the penetration.

According to another aspect of the present invention, a method is provided for reducing signal loss in the detection of an object positioned in the ground. The method includes the steps of providing a detector having at least one transducer and a dielectric medium; placing the detector in contact with the ground so that the dielectric medium is positioned between the at least one transducer and the ground; and communicating a ground-penetrating signal through the dielectric medium between the at least one transducer and the ground to substantially reduce signal loss.

BRIEF DESCRIPTION OF THE DRAWINGS

The above-mentioned and other features of the present disclosure will become more apparent and the present disclosure itself will be better understood by reference to the following description of embodiments of the present disclosure taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are described so that others skilled in the art may utilize its teachings.

Figure 1:
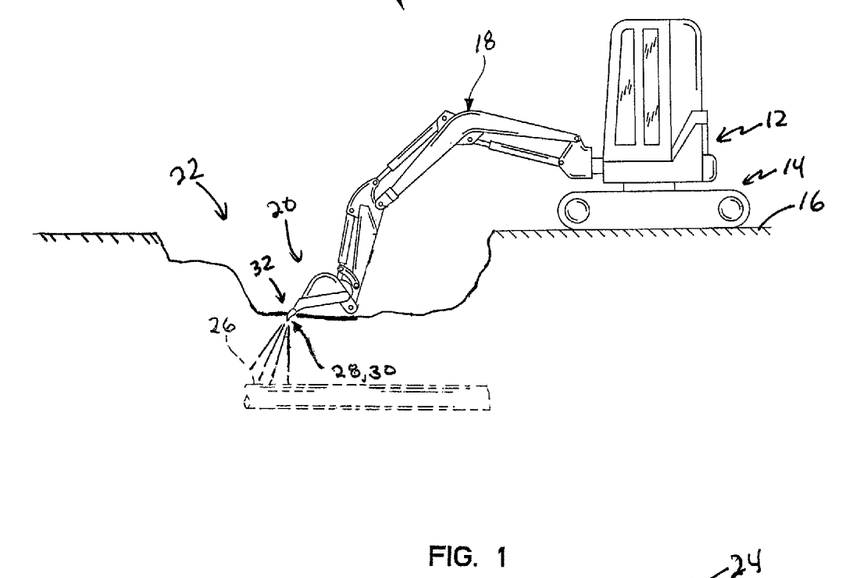
FIG. 1 is a side elevation view of an excavator showing the excavator excavating an area and having a ground penetrating radar positioned on a tip of the excavator bucket to detect objects located in the ground.

An excavator 10 is shown in FIG. 1 that includes a chassis 12 and a plurality of traction devices 14, such as tracks, that support and propel chassis 12 over the ground 16. Excavator 10 further includes a boom 18 supporting a work tool or bucket 20 that is configured to penetrate the ground 16 to create a trench, hole, pit, or other depression 22 in the ground 16. Excavator 12 further includes an object detection radar system 24, shown in FIG. 2, which is configured to detect objects 26, such as a utility pipes and wires, in the ground 16. Although an excavator 10 is shown in FIG. 1 and discussed in the application, other construction vehicles, such as backhoes, loaders, bulldozers, graders, and other constructions vehicles may be provided with objection detection system 24. Further, although traction devices 14 are shown as tracks, other traction devices, such as wheels may be provided on construction vehicle 10.

Portions of object detection radar system 24 are mounted on bucket 20. According to the preferred embodiment of the present disclosure, detection system 24 includes a transmitter 28 and/or a receiver/detector 30 mounted on bucket 20. For example, according to the embodiment shown in FIG. 1, transmitter 28 and detector 30 are mounted on one or more teeth 32 of bucket 20. Transmitter 28 and detector 30 may also be mounted on other construction equipment work tools, such as bull dozer or grader blades, loader or backhoe buckets, or other work tools.

With transmitter 28 and detector 30 mounted on teeth 32, transmitter 28 and detector 30 are in direct contact with the ground 16 during excavation of depression 22. By placing transmitter 28 and detector 30 in direct contact with the ground 16, signal losses are reduced during communication of the ground-penetrating signal between the transducer and the ground 16.

Figure 2:
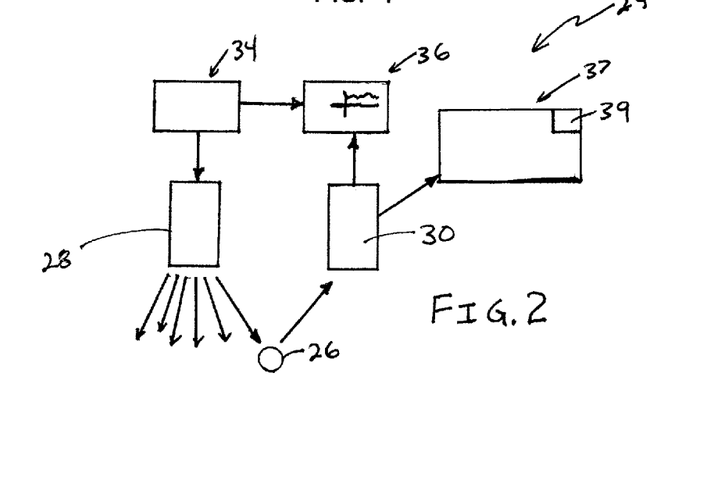
FIG. 2 is a schematic diagram of ground penetrating radar showing the radar including a transmitting antenna and a receiving antenna that transmit and detect objections located in the ground.

Transmitter 28 is configured to emit electromagnetic waves and receiver 30 is configured to detect electromagnetic waves. As shown in FIG. 2, detection system 24 includes a signal generator 34, such as a Picosecond Pulse Labs Generator Model 4500D, and a signal detection monitor 36, such as a Tektronix Oscilloscope Model DSA 8200). Signal generator 34 provides a signal to transmitter 34 that emits the ground-penetrating signal into the ground 16 and provides a trigger signal to monitor 36. Objects 26, such as a pipe, reflect the ground-penetrating signal and detector 30 detects signals reflected off of object 26. Monitor 36 provides a visual representation of the reflected signal for visual analysis. A computer 37 with a processor 39 may also be used to analyze the signal provide from detector 30.

Figure 3:
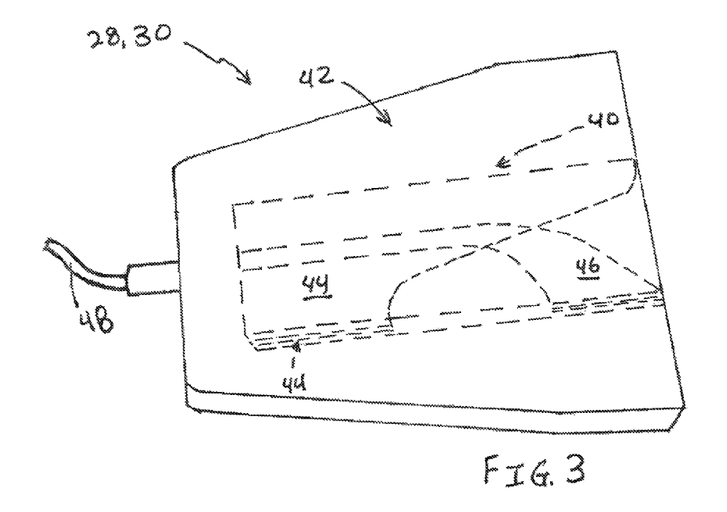
FIG. 3 is a perspective view of a portion of an excavator bucket tooth including an encapsulated transceiver antenna, shown in phantom.
Figure 4:
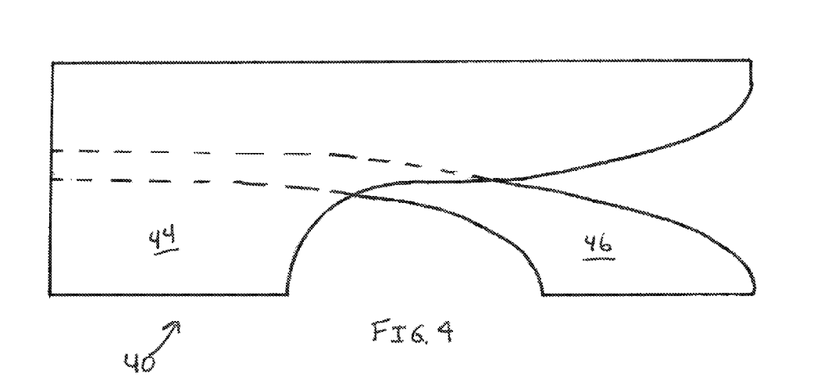
FIG. 4 is a plan view of the metallization layers of the encapsulated antenna of FIG. 3.

One embodiment of transmitter 28 and detector 30 is shown in FIG. 3 as a Vivaldi antipodal antenna. Each of transmitter 28 and detector 30 includes a Vivaldi antenna 40 and body 42 that encapsulates antenna 40. Antenna 40 is an electromagnetic transducer that detects/coverts electromagnetic waves into signals useable for analysis. As discussed below, other types of antennas and other transducers may also be used according to the present disclosure.

After fabrication of antenna/transducer 40, it is encased in one or materials that define body 42 to provide a protective casing or shell around antenna 40. According to the preferred embodiment of the present disclosure, body 42 is made of a high strength dielectric medium. The dielectric material may be a polymer or a ceramic material that may include microfibers or nano-fiber to enhance the durability of body 42. For example, according to one embodiment, body 42 is made of high modulus polyurea with a dielectric constant of approximately 4. Other example materials include 100% solids rigid polyurethane, 100% solids epoxy, and other non-conductive materials. Body 42 may also be coated with materials to increase its durability. Body 42 may also be coated with carbon or other electromagnetic insulating materials to insulate antenna 40 from adjacent conductive surfaces to reduce or prevent signal leakage, ringing, or other interference. Preferably, the dielectric medium has a dielectric constant about equal to the ground 16. According to the present disclosure, the dielectric medium has a dielectric constant ranging from about 1 to about 20, but may have other values.

One embodiment of transmitter 28 and detector 30 is shown in FIG. 3 as a Vivaldi antipodal antenna. Each of transmitter 28 and detector 30 includes a Vivaldi antenna 40 and body 42 that encapsulates antenna 40. Antenna 40 is an electromagnetic transducer that detects/converts electromagnetic waves into signals useable for analysis. As discussed below, other types of antennas and other transducers may also be used according to the present disclosure.

Figure 5:
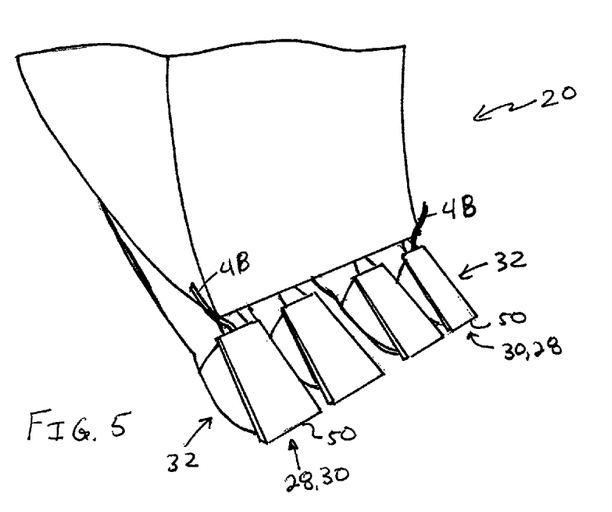
FIG. 5 is a view of the antenna of FIG. 3 mounted on an excavator bucket.

In operation, antenna/transducer 40 and body 42 are mounted or otherwise coupled to tooth 32 as shown in FIG. 5. A signal from signal generator 34 is provided to antenna 40 through a cable 48. During excavating, as shown in FIG. 1, antenna 40 and body 42 are repeatedly positioned in ground 16 as dirt and other materials are excavated. As a result, antenna 40 is often positioned below the lowest portions of tracks 14. Further, antenna 40 is positioned into penetrations, such as depression 22, created by excavator 10 during the excavation process. As shown in FIG. 1, antenna 40 of transmitter 28 and detector 30 are simultaneously positioned in the soil 16 as teeth 32 create penetrations in the soil 16.

While positioned in the penetrations, signals are transmitted and detected by antennas 40 of transmitter 28 and detector 30. Because antenna 40 and dielectric body 42 are mounted on teeth 32, they cooperate to define cutting elements of teeth 32 with portions of body 42 defining a cutting edge 50 of tooth 32. Thus, simultaneously with excavation, objects 26 are being detected. Further, because bodies 42 and antennas are 40 are able to be lowered into penetrations 22 and assists in creating penetrations 22, objects 26 are closer to antenna 40 and more easily detected than if one was attempting to detect objects 26 before any excavation started. Body 42 is positioned between antenna 40 and the soil to protect antenna 40 during excavation. As a result, the signals transmitted and received by antennas 40 pass through body 42 on their way from and antenna 40 during respective transmission of the signal and receipt of the reflected signal.

Figure 6A:
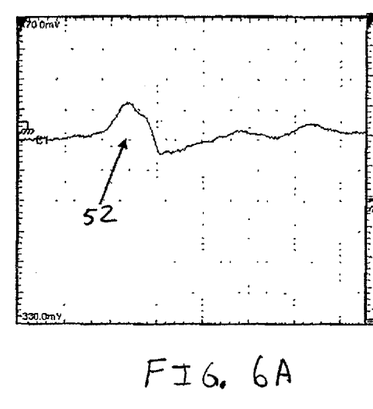
FIG. 6A is a graphical representation of the signal detected by the antenna of FIG. 2 with the transmitting and receiving antennas are positioned above the ground consisting of soil.
Figure 6B:
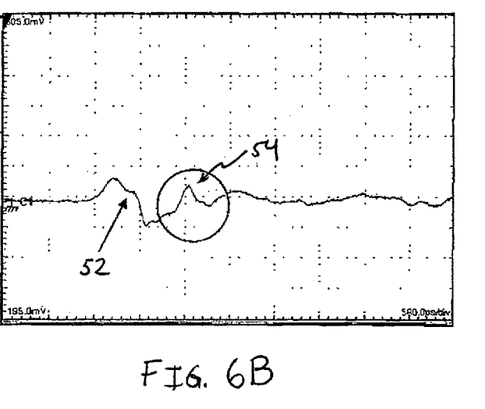
FIG. 6B is a view similar to FIG. 6A showing the signal detected by the antenna with the transmitting and receiving antennas positioned in contact with the ground and showing a peak indicative of a plastic pipe located in the ground.

Example outputs from detectors 30 are provided in FIGS. 6A-9C. In FIG. 6A, a signal is shown when antennas/transducers 40 of transmitter 28 and detector 30 are positioned above ground 16 without direct contact between the respective antennas 40 and ground 16. A peak 52 is shown that indicates cross talk between antenna 40 of transmitter 28 and antenna 40 of detector 30. In FIG. 6B, antennas 40 of respective transmitter 28 and detector 30 are placed in direct contact with ground 16. In addition to showing cross-talk peak 52, a second peak 54 is shown indicating the presence of a 2 inch (51 millimeters) diameter polyethylene pipe that was buried 4 inches (102 millimeters) in the test soil. As a result, a perceptible indication is provided indicating that an object 26, such as a plastic natural gas pipe, is in the path of bucket 20. A trained operator of excavator 10 can notice this indication to avoid striking pipe 26. Similarly, computer 37 can be programmed to recognize any peak after cross-talk peak 52 that satisfies a predetermined characteristic, such as slope. If computer 37 detects such a peak, or other predetermined characteristic, it can send an alarm, stop further movement of bucket 20, or otherwise attempt to avoid bucket 20 striking pipe 26.

Figure 7A:
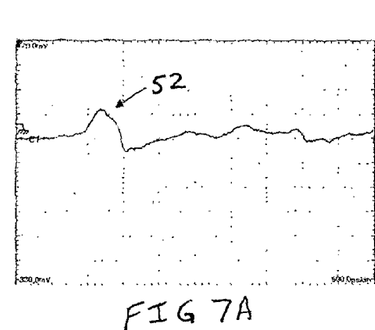
FIG. 7A is a graphical representation of the signal detected by the antenna of FIG. 3 with the transmitting and receiving antennas are positioned above the ground consisting of sandy soil with no object in the sandy soil.
Figure 7B:
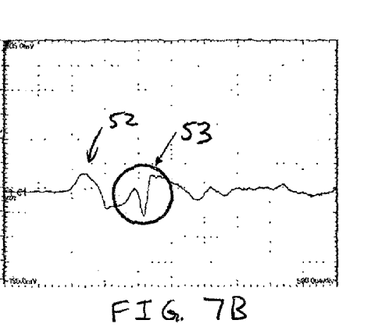
FIG. 7B is a view similar to FIG. 7A showing the signal detected by the antenna with the transmitting and receiving antennas positioned in contact with the ground and showing a peak indicative of a steel pipe located in the sandy soil.
Figure 8A:
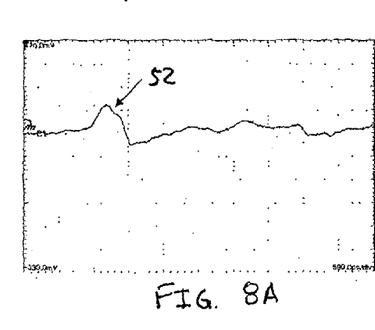
FIG. 8A is a graphical representation of the signal detected by the antenna of FIG. 3 with the transmitting and receiving antennas are positioned above the ground consisting of sandy soil with no object in the sandy soil.
Figure 8B:
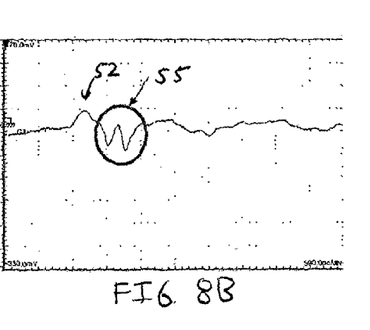
FIG. 8B is a view similar to FIG. 8A showing the signal detected by the antenna with the transmitting and receiving antennas positioned in contact with the ground and showing a peak indicative of a polyethylene pipe located in the sandy soil.

In addition to detecting objects 26, the reflections detected by detector 30 can also be used to determine characteristics of objects 26 buried within the ground 16. For example, FIGS. 7A and 7B illustrate the output of detector 30 for a 2 inch (51 millimeters) metal pipe buried in sandy soil at a depth of 4 inches (102 millimeters). In FIG. 7A, antennas/tranducers 40 of transmitter 28 and detector 30 are above the ground 16. In FIG. 7B, they are in direct contact with the ground and provide a distinctive, "cursive v" 53 pattern indicative of the metal pipe. FIGS. 8A and 8B illustrate the output of detector 30 for a 1 inch (25 millimeters) polyethylene pipe buried in sandy soil at a depth of 2 inches (51 millimeters). In FIG. 8A, antennas 40 of transmitter 28 and detector 30 are above the ground 16. In FIG. 8B, they are in direct contact with the ground and provide a distinctive, "w" pattern 55 indicative of the plastic pipe. A trained operator of excavator 10 can notice the distinctive patterns 53, 55 of metal, polyethylene, and other pipes do determine the type of pipe. Similarly, computer 37 can be programmed to recognize any peak after cross-talk peak 52 that satisfies a predetermined characteristic, such as the shape of patterns 53, 55. If computer 37 detects such a pattern, or other predetermined characteristic, it can send an indication of the type of pipe, such as metal or plastic.

Figures 9A, 9B, 9C:
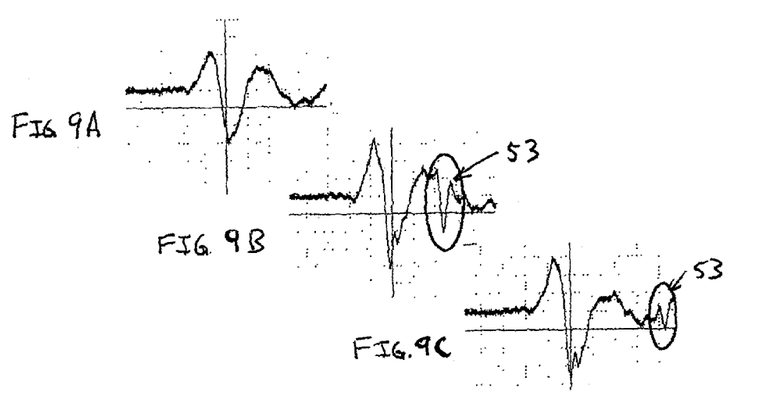
FIG. 9A is a graphical representation of a soil without an object located in the soil.
FIG. 9B is a view similar to FIG. 9A showing a graphical representation with an steel pipe located 6 inches (152 millimeters) deep in the soil.
FIG. 9C is a view similar to FIG. 9A showing a graphical representation with the steel pip located 10 inches (254 millimeters) deep in the soil.

In addition to determine the presence and type of object 26, the reflections detected by detector 30 can also be used to determine the distance of object 26 from bucket 20 (or any other portion of excavator 10). Additional representations of the reflections detected by detector 30 are provided in FIGS. 9A-9C. In FIG. 9A, no object 26 is placed in the test soil so that no object 26 is detected when antennas 40 are placed in contact with ground 16. In FIG. 9B, a 2 inch (51 millimeters) diameter steel pipe was placed 6 inches (152 millimeters) deep in sandy soil and in FIG. 9C, the same pipe was placed 10 inches (254 millimeters) deep in the sandy soil. As shown by the circled region in FIGS. 9B and 9C, "cursive v" pattern 53 of the steel pipe occurs later in time in FIG. 9B than in FIG. 9C because the reflection took longer to reach detector 30 after being sent by transmitter 32. A trained operator of excavator 10 can notice the gap in time between a feature, such as cross-talk peak 52, and distinctive pattern 53 to determine the distance from object 26. Similarly, computer 37 can be programmed to recognize the time delay and calculate the distance of tooth 32 of bucket 20 from object 26 and provide an indication to the operator of the distance and/or use the distance as a trigger for an alarm or otherwise. The operator may use this distance information when perform fine movements around objects 26, such as known utility pipes or cables.

Figures 10, 11, 12, 13, 14:
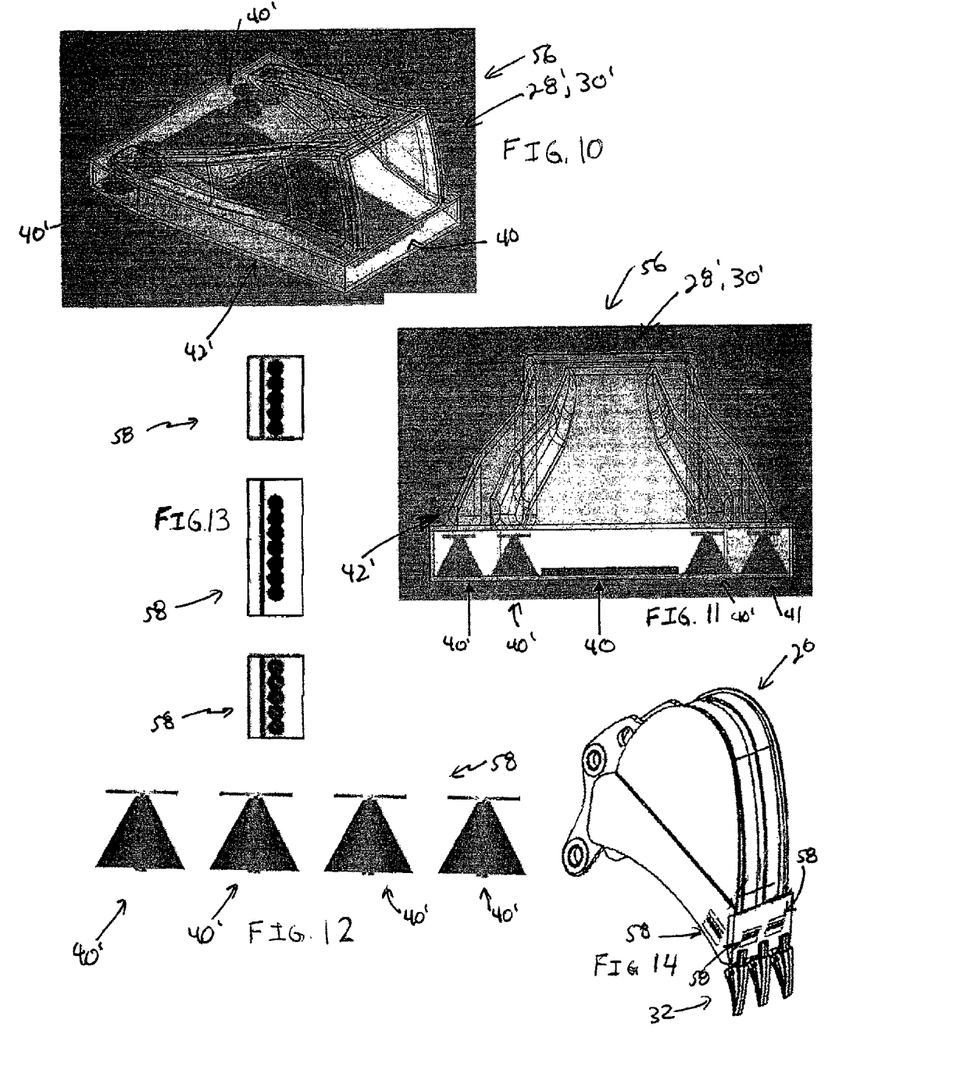
FIG. 10 is a perspective view of bucket tooth showing the tooth including four discone antennas and a Vivaldi antenna.
FIG. 11 is an end view of a bucket tooth of FIG. 10.
FIG. 12 is an end view of an array of discone antennas.
FIG. 13 is a top view of a combination of discone antenna arrays.
FIG. 14 is a view of an excavator bucket showing discone antenna arrays mounted thereon.

Another embodiment of transmitter 28' and detectors 30' is shown in FIG. 11 that includes four discone antennas/transducers 40' performing as detectors 30' and a Vivaldi antipodal antenna 40 performing as a transmitter 28'. Combined transmitter/detector 56 includes body 42' that encapsulates antennas 40, 40' in a manner similar to body 42. To enhance the directionality of discone antennas 40', if used as transmitters, they may be aligned in an array 58 as shown in FIG. 12. To further increase the directionality, a reflective metal plate (not shown) may be placed at the back of array 58. In FIG. 13, several arrays 58 with differing numbers of discone antennas 40' are provided as detectors and a transmitter to detect objects 26. As shown in FIG. 14, arrays 58 may be placed on bucket 20 in locations other than on tooth 32.

While this invention has been described as having preferred designs, the present invention can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains and which fall within the limits of the appended claims.

What is claimed is:

1. A construction vehicle including:
   a chassis;
   a plurality of traction devices positioned to support the chassis;
   a work tool supported by the chassis and configured to penetrate the ground, the work tool including a bucket and a plurality of teeth coupled to the bucket; and
   a plurality of detectors mounted to the work tool and configured to detect an object positioned in the ground during a penetration of the ground with the work tool, each detector being mounted to a different tooth of the work tool, at least one detector including a dielectric medium and a transmitter positioned in the dielectric medium operative to transmit a ground-penetrating signal, the dielectric medium and the ground having substantially the same dielectric properties to substantially reduce signal loss during a communication of the ground-penetrating signal, the at least one detector being configured to detect metal and non-metal objects positioned in the ground, the at least one detector further including an electromagnetic insulating material substantially coating the dielectric medium to insulate the transmitter from adjacent conductive surfaces to reduce at least one of signal leakage and ringing.

2. The construction vehicle of claim 1, wherein each detector includes at least one transducer and a dielectric medium, and the at least one transducer is configured to communicate a ground-penetrating signal.

3. The construction vehicle of claim 2, wherein the dielectric medium is positioned between the at least one transducer and the ground during a communication of the ground-penetrating signal to substantially reduce signal loss during the communication of the ground-penetrating signal between the at least one transducer and the ground, and the plurality of detectors are configured to communicate the ground-penetrating signal in a plurality of directions.

4. The construction vehicle of claim 3, wherein the dielectric medium contacts the ground during the communication of the ground-penetrating signal.

5. The construction vehicle of claim 2, wherein the at least one transducer is configured to transmit the ground-penetrating signal to the object positioned in the ground and receive a reflection signal of the ground-penetrating signal from the object.

6. The construction vehicle of claim 5, further including a processor configured to calculate a distance between the at least one transducer and the object based on a time delay between the transmission of the ground-penetrating signal and the reception of the reflection signal.

7. The construction vehicle of claim 5, further including a processor configured to characterize the object based on the reflection signal.

8. The construction vehicle of claim 1, wherein each detector is mounted near a cutting surface of the work tool.

9. A detector assembly configured to detect an object positioned in the ground, the detector assembly including:
at least one transducer configured to communicate a ground-penetrating signal, the at least one transducer including a plurality of antennas including at least one transmitting antenna configured to transmit the ground-penetrating signal and an array of receiving antennas configured to detect a reflection signal of the ground-penetrating signal from the object; and
a dielectric medium substantially encapsulating the at least one transducer to substantially reduce signal loss during a communication of the ground-penetrating signal between the at least one transducer and the ground, the dielectric medium being configured to contact the ground during the communication of the ground-penetrating signal, the plurality of antennas each being substantially encapsulated in the dielectric medium and each being mounted along a cutting surface of the work tool, the dielectric medium defining a leading cutting edge of the work tool.

10. The detector assembly of claim 9, further including a work tool configured to penetrate the ground, the at least one transducer being mounted to the work tool.

11. The detector assembly of claim 10, wherein the work tool is an excavator bucket.

12. The detector assembly of claim 9, wherein the at least one transducer is configured to transmit the ground-penetrating signal to the object positioned in the ground and receive a reflection signal of the ground-penetrating signal from the object.

13. The detector assembly of claim 9, wherein the at least one transducer is part of a transducer array.

14. The detector assembly of claim 9, wherein the dielectric medium is one of a polymer and a ceramic.

15. The detector assembly of claim 9, further including an electromagnetic insulating material substantially coating the dielectric medium.

16. The detector assembly of claim 9, further including a coating material substantially coating the dielectric medium and having a hardness greater than the hardness of the dielectric medium.

17. A detector assembly configured to detect an object positioned in the ground, the detector assembly including:
a work tool configured to penetrate the ground, the work tool including a plurality of teeth;
at least one transducer coupled to a tooth of the work tool and configured to communicate a ground-penetrating signal, the at least one transducer including an antipodal Vivaldi antenna spanning a majority of a length of the tooth; and
a dielectric medium positioned between the at least one transducer and the ground during a communication of the ground-penetrating signal to substantially reduce signal loss during the communication of the ground-penetrating signal between the at least one transducer and the ground.

18. The detector of claim 17, wherein the dielectric medium contacts the ground during the communication of the ground-penetrating signal, the dielectric medium and the ground having substantially the same dielectric properties.

19. The detector of claim 17, wherein the at least one transducer is configured to transmit the ground-penetrating signal to the object positioned in the ground and receive a reflection signal of the ground-penetrating signal from the object.

20. The detector of claim 19, further including a processor configured to calculate a distance between the at least one transducer and the object based on a time delay between the transmission of the ground-penetrating signal and the reception of the reflection signal.

21. The detector of claim 19, further including a processor configured to characterize the object based on the reflection signal.

22. The detector of claim 19, wherein the at least one transducer includes a first transducer that transmits the ground-penetrating signal to the object and a second transducer that receives the reflection signal from the object, wherein the first transducer is coupled to a first tooth of the work tool and the second transducer is coupled to a second tooth of the work tool.

23. The detector of claim 17, wherein the ground-penetrating signal is an electromagnetic signal.

24. The detector of claim 17, wherein the antenna includes a conducting plate positioned in a first plane and a ground plate positioned in a second plane.

25. A method of detecting an object positioned in the ground including the steps of:
providing a work tool and a detector mounted to the work tool that communicates a ground-penetrating signal between the object and the detector, the work tool being configured to penetrate the ground, the detector forming a leading cutting edge of the work tool and including a transmitting antenna and an array of receiving antennas each mounted along the leading cutting edge of the work tool, the detector including a dielectric medium substantially encapsulating the transmitting antenna and the array of receiving antennas and forming the leading cutting edge of the work tool, the transmitting antenna being configured to transmit the ground-penetrating signal and the array of receiving antennas being configured to detect a reflection signal of the ground-penetrating signal from the object;
penetrating the ground with the work tool to create a penetration;
positioning at least a portion of the detector in the penetration; and
detecting the object with the detector while the at least a portion of the detector is located in the penetration.

26. The method of claim 25, wherein the positioning step is simultaneous with the penetrating step.

27. The method of claim 25, further including the step of determining a distance between the detector and the object based on a time delay between the transmission of the ground-penetrating signal and the reception of the reflection signal.

28. The method of claim 25, further including the step of characterizing the object based on the reflection signal.

29. The method of claim 25, wherein the transmitting antenna includes an antipodal Vivaldi antenna that transmits the ground-penetrating signal to the object and the array of receiving antennas includes discone antennas that receive the reflection signal from the object.

30. The method of claim 25, wherein the dielectric medium contacts the ground during the communication of the ground-penetrating signal, and the dielectric medium and the ground having substantially the same dielectric properties.

31. The method of claim 25, further including the step of using construction equipment to move the work tool during the penetrating step, the construction equipment including:
   a chassis;
   a plurality of traction devices positioned to support the chassis; and
   a propulsion device supported by the chassis and configured to move the work tool during the penetrating step to create the penetration,
   the detector being positioned below the propulsion device during the penetrating step.

32. The method of claim 25, wherein the ground-penetrating signal is an electromagnetic signal.

33. A method of reducing signal loss in the detection of an object positioned in the ground, including the steps of:
   providing a work tool configured to penetrate the ground, the work tool including a tooth;
   providing a detector having at least one transducer and a dielectric medium, the detector being mounted to the work tool, the dielectric medium of the detector forming an outer profile of the tooth and substantially encapsulating the at least one transducer, the at least one transducer including an array of discone antennas operative to detect a ground-penetrating signal;
   placing the detector in contact with the ground so that the dielectric medium is positioned between the at least one transducer and the ground; and
   communicating a ground-penetrating signal through the dielectric medium between the at least one transducer and the ground to substantially reduce signal loss.

34. The method of claim 33, wherein the at least one transducer further includes a transmitting antenna configured to transmit the ground-penetrating signal to the object positioned in the ground, and the array of discone antennas are operative to receive a reflection signal of the ground-penetrating signal from the object.

35. The method of claim 33, wherein the dielectric medium contacts the ground, the dielectric medium and the ground having substantially the same dielectric properties.

36. The method of claim 33, wherein the dielectric medium forms a cutting edge of the tooth of the work tool.

\* \* \* \* \*